2,732,359

SOLUTIONS OF ACRYLONITRILE POLYMERS IN MOLTEN TRICHLORONITROPROPANOL

Hobson D. De Witt, Decatur, Ala., assignor to The Chemstrand Corporation, Decatur, Ala., a corporation of Delaware No Drawing. Application December 8, 1954,
Serial No. 474,040

12 Claims. (Cl. 260—32.4)

This invention relates to a new method of preparing synthetic fibers from polymers of acrylonitrile. More particularly, the invention relates to a new solvent material for acrylonitrile polymers, and to completely miscible mixtures including acrylonitrile polymers, from which mixtures quality fibers can be extruded.

It is well known that polymers of over 70 percent acrylonitrile are capable of being fabricated into high-strength fibers. The conventional technique for preparing fibers from these polymers involves the dissolution of the polymer in a suitable solvent and thereafter extruding the viscous solution so prepared through an orifice into a medium which removes the solvent and precipitates the acrylonitrile polymer in a continuous form. Many solvents have been proposed but many of them are impracticable due to various disadvantages possessed by them, such as excessive cost, poor color, tendency of the solution to gel upon standing or cooling, etc.

The primary purpose of this invention is to provide a new low-cost solvent for the preparation of synthetic fibers. A further purpose of this invention is to provide a solvent material which forms more stable mixtures or solutions of acrylonitrile polymers. A still further purpose of the invention is to provide a method of forming fibers of high tensile strength and desirable elongation.

I have now discovered that trichloronitropropanol is an excellent solvent for acrylonitrile polymers containing 70 percent or more of acrylonitrile and that the resulting stable solutions are particularly adapted to commercial spinning operations to produce fibers and filaments possessing superior physical characteristics. The trichloronitropropanol possesses several novel properties which make it outstanding as a spinning solvent.

The boiling point of the technical or commercial grade of trichloronitropropanol contributes to efficient separation of solvent from water in recovery operations following spinning, and makes possible the preparation of bubble-free polymer solutions of high concentration at high temperatures using either batch or continuous techniques.

Since at room temperature trichloronitropropanol is a solid, it must be heated at least to its melting point in order to dissolve the acrylonitrile polymers. This melting point lies between about 45 and 50° C. The phenomenon of "balling up" common to many organic solvents which are liquids at room temperature is thereby avoided. Further, since the acrylonitrile polymers dissolve slowly at just above the melting point of the trichloronitropropanol, gradual heating is desired to secure more rapid dissolution of the polymers. Gradual heating of a mixture of trichloronitropropanol and acrylonitrile polymers to from about 65 to 100° C. produces solutions of desirable viscosity ranges, and a solution so prepared can be cooled to room temperature and below without the formation of gels or precipitation of the dissolved polymer.

The wet spinning method of fiber preparation is particularly adaptable to the use of molten trichloronitropropanol as the polymer solvent. Because of the slower rate of solution of trichloronitropropanol in water as compared to the rates of solution of other known solvents, for example N,N-dimethylformamide and N,N-dimethylacetamide, it is possible to obtain clear, transparent fibers, whereas, the fibers prepared from solutions in conventional solvents, on precipitation in water are cloudy, opaque, and filled with voids.

While molten trichloronitropropanol is an excellent solvent for copolymers of 70 or more percent of acrylonitrile and up to 30 percent of other polymerizable monomers, the invention is particularly useful with polymers of acryonitrile containing at least 85 percent acrylonitrile and up to 15 percent of another polymerizable monomer. The other monomers in the acrylonitrile copolymer may be vinyl acetate and other vinyl esters of monocarboxylic acids, methyl methacrylate, and other alkyl esters of methacrylic acid, ethyl acrylate, and other alkyl esters of acrylic acid, methacrylonitrile, vinylidene chloride, ethyl maleate, and other alkyl esters of maleic acid, ethyl fumarate and other alkyl esters of fumaric acid, styrene, and other vinyl-substituted aromatic compounds, α-methylstyrene and other isopropenyl aromatic hydrocarbons, vinyl chloride and other vinyl halides, 2-vinylpyridine, 2 - methyl - 5 - vinylpyridine and other vinyl-substituted heterocyclic amines, and other polymerizable monomers capable of copolymerization with acrylonitrile.

The trichloronitropropanol is also particularly useful as a solvent for processing fibers from blended compositions. Since many acrylonitrile polymers are not dyeable by conventional dyeing procedures, it has been proposed to blend them with polymers capable of reacting chemically with dyestuff, whereby the mixed compositions acquire dyeability such that the fibers have general purpose utility. Suitable blending agents are the polymeric compositions of polymerizable monomers containing tertiary amino radicals or other radicals capable of being converted into tertiary amino groups subsequent to the polymerization. Thus, copolymers of vinylpyridines, for example 2-vinylpyridine, the alkyl vinylpyridines, for example 2-methyl-5-vinylpyridine, the various vinylquinolines and alkyl-substituted vinylquinolines, the various vinylpyrazines, the alkyl-substituted vinylpyrazines, and various vinyloxazoles and imidazoles including N-vinylimidazoles, and vinylbenzimidazoles, are useful. Similarly, related allyl and methallyl derivatives of the above compounds are useful. The vinyl, allyl, and methallyl haloacetates can be reacted with secondary amines either before or after polymerization, and the polymers formed thereof blended with non-dyeable acrylonitrile polymers to develop dye affinity. These dyeable blending polymers may be homopolymers or they may be copolymers with any monomer polymerizable therewith, for example, acrylonitrile, styrene, vinyl chloride, vinylidene chloride, and vinyl acetate. In blending the polymers, a substantial proportion of the fiber-forming acrylonitrile polymer, for example 75 to 98 percent, should be used, depending upon the extent of dye receptivity desired and upon the proportion and relative effectiveness of the reactive monomer present. For example, a suitable blending polymer is one containing ten to 70 percent by weight of acrylonitrile and 30 to 90 percent by weight of a vinylpyridine or an alkyl-substituted vinylpyridine. Suitable blends of blended compositions are those containing at least 75 percent by weight of acrylonitrile based on the total polymerized monomers in the blend. In general, from two to ten percent of the total of all polymerized monomers present should be the dye-reactive component. The same increased dye affinity may also be achieved by the formation of terpolymers of acrylonitrile, a copolymerizable monomer, and a copolymerizable dye-reactive component. In general, I prefer to employ terpolymers of from about 85 to 95 percent acrylonitrile, from about three to about eight percent of a compound selected from the group consisting of vinylpyridines and alkyl-substituted vinylpyridines, and from about two to about seven percent of one of the above-named monomers copolymerizable with acrylonitrile.

All the polymeric materials described above, both polymers and blends, are soluble in molten trichloronitropropanol at temperatures of from about 50 to about 100° C., and solutions prepared by so heating a mixture of the polymeric material and the solvent material are stable at room temperatures and below to give fluid solutions completely free of gel formation or polymer precipitation.

In the practice of this invention, as it is in the preparation of all acrylonitrile fibers, the molecular weight of the polymer is of critical importance. The polymer should have a molecular weight in excess of 10,000, and preferably in excess of 25,000. These molecular weights are determined by measuring the viscosity of the polymer when dissolved in a suitable solvent, such a dimethylformamide, in a manner well-known to the art. It is also very desirable to use acrylonitrile polymers which are substantially uniform throughout with respect to the chemical composition and physical structure. Such uniform polymers enable the practice of the invention more economically, permitting the utilization of continuous, uninterrupted spinning and greatly minimizing fiber fractures and clogging of the spinnerets.

In the practice of this invention, the polymers of acrylonitrile are used in finely divided form. Although massive polymers may be ground to desired particle size, preferably solvent-non-solvent polymerization procedures are employed in the preparation of the polymer. The subdivided states of the polymers obtained by spray drying the emulsions or by filtration and subsequent drying of the solid polymers enable them to be used directly. The finely divided polymer is mixed with molten trichloronitropropanol in any mixing device, such as a dough mixer or a homogenizer, suitably heated to maintain the solvent material in a molten state. It is desirable to use a solution of as high a concentration of the polymer as possible, but the maximum concentration is dependent upon the molecular weight of the polymer.

To obtain fibers of optimum physical properties, polymers of molecular weights in excess of 25,000 are used, and when using such polymers it is only possible to dissolve from about five to about 35 percent in the trichloronitropropanol without exceeding practical viscosity values. Although as low as five percent of the polymer can be used in spinning operations, such concentrations are undesirable because they necessitate the removal and recovery of too much solvent from the extruded solution, thereby increasing solvent recovery costs and reducing spinning speeds by reason of the longer periods required for coagulation. The concentration of the polymer in the solution is preferably between about seven and about 20 percent but will ultimately be determined by considering the desired physical properties of the fiber and the speed of spinning, which speed is a function of the concentration and viscosity of the polymer solution. The viscosity will depend upon the chemical composition and molecular weight of the polymers. The optimum proportions can best be determined by selecting a uniform molecular weight polymer having good fiber-forming properties and dissolving it in the smallest amount of the trichloronitropropanol necessary to form a viscous solution capable of extrusion at convenient temperatures.

The fibers are spun by extruding the trichloronitropropanol solution of the acrylonitrile polymer through an orifice or a spinneret having a plurality of orifices, into a medium which removes the solvent. The volume of the solution passing through the spinneret per unit of time must be constant in order to produce a fiber of uniform size. This is best achieved by using a positively driven gear pump constructed of corrosion-resistant metals, such as stainless steel, and adapted to deliver a constant flow of solution regardless of minor changes in viscosity and regardless of the resistance offered by the spinneret. It is also desirable to pass the solution through one or more filters before reaching the spinneret in order to remove all possible traces of foreign matter and particles of incompletely dissolved polymer. The polymer solution may be delivered to the gear pump by means of pressure applied by an inert gas to the liquid surface of the solution reservoir, which must be heated to maintain the solution fluid enough to pass through the conduits. The gear pump, filter devices, and conduits in the spinneret are preferably heat insulated and may be heated to maintain the body of solution in liquid state. The extruding operation should be conducted at elevated temperatures, but far enough below the boiling point of the solvent to prevent bubbles or other irregularities in the fiber.

The medium into which this solution is extruded and which removes the solvent may be either liquid or gaseous. The method involving the use of liquids is known as "wet spinning," and any liquid which is non-solvent for the acrylonitrile polymer, which either dissolves the trichloronitropropanol, or converts it into soluble compounds, may be used. The solvent is leached out of the stream of polymer solution, which first becomes a viscous stream and finally a solid filament. When a spinneret with a plurality of apertures is used, the several streams of polymer converge and ultimately form a single strand or tow. The spin bath must necessarily be of sufficient size to permit the complete, or substantially complete, removal of the trichloronitropropanol. Obviously, the rapidity of extrusion will affect the size of the spin bath, high speeds requiring much longer baths. The temperatures of the bath also affect the size, high temperature permitting more rapid diffusion of the trichloronitropropanol from the fiber and enabling the use of shorter baths.

The use of trichloronitropropanol as a solvent material for acrylonitrile polymers can be adapted to "dry spinning" operations, wherein air, steam, nitrogen or other gas, or mixtures of gases which are inert at the spin temperature are used to remove the solvent. This method operates at higher temperatures; and the trichloronitropropanol is evaporated from the surface of the fiber. The maximum temperature to which the fibers can be subjected is usually the boiling point of trichloronitropropanol, but to prevent the degradation of the acrylonitrile polymer operation at lower temperatures is desirable. The fiber may be heated by convection from the hot gaseous medium or by radiation from the walls of the spinning cell. Generally, a combination of both convection and radiation is involved, but methods involving principally radiation are generally more efficient and permit the operation with the wall temperature considerably higher than the temperature on the surface of the fibers. The evaporation of the trichloronitropropanol from the fiber surface and the speed of the fiber prevent the development of a temperature exceeding that at which the fiber is stable to decomposition. The dry spinning method is particularly useful at high rates of extrusion.

In general, the methods of both wet and dry spinning commercially used are adaptable for spinning from trichloronitropropanol solutions, but special considerations may be involved due to the different chemical nature of trichloronitropropanol. Automatic machinery for spinning continuously, drying the thread if necessary, and winding it on suitable spools may be modified with the teaching of this specification. As in the case of most synthetic fibers, the fibers of acrylonitrile copolymers spun from trichloronitropropanol solutions may be stretched to develop optimum physical properties. If desired, part of the necessary stretching may be accomplished in the spinning medium by drawing the fiber out of the bath at a rate more rapid than the rate of extrusion.

The following examples in which parts, proportions, and percentages are by weight illustrate further the applications of the principles of the invention.

*Example 1*

A mixture of three parts of polyacrylonitrile and 20 parts of solid trichloronitropropanol was thoroughly mixed. The mixture was then warmed to 80° C. and maintained for 15 minutes with stirring to effect solution of the polymer in the molten trichloronitropropanol. A clear, viscous solution was obtained which was stable upon cooling to room temperature. This solution was suitable for extrusion into a non-solvent coagulating bath, such as aqueous methanol, lower alcohols, dioxane, etc., to yield fibers and films.

*Example II*

One part of a copolymer of 94 percent acrylonitrile and six percent vinyl acetate was mixed with approximately seven parts of molten trichloronitropropanol. The mixture was heated gradually to approximately 80° C. and maintained for 15 minutes with stirring to effect solution. A clear, viscous solution resulted which was stable on cooling and showed no evidence of gel formation or precipitation of the polymer. The solution was suitable for extrusion into a non-solvent coagulating bath to yield fibers and films.

*Example III*

One part of a blend of 88 percent of a copolymer of 94 percent acrylonitrile and six percent vinyl acetate and 12 percent of a copolymer of 50 percent 2-methyl-5-vinylpyridine was mixed with seven parts of molten trichloronitropropanol. The mixture was gradually heated to approximately 85° C. and with stirring to effect solution. A clear, viscous solution resulted which was stable on cooling and which was suitable for extrusion into a nonsolvent coagulating bath for the formation of fibers and films.

I claim:

1. A new composition of matter comprising a homogenous miscible mixture of molten trichloronitropropanol and a polymer of which acrylonitrile is at least 70 percent of the total polymerized monomer content.

2. A new composition of matter comprising a polymer of which acrylonitrile is at least 70 percent of the total polymerized monomer content dissolved in molten trichloronitropropanol.

3. A new composition of matter comprising a homogeneous miscible mixture of from about 65 to 95 percent by weight of molten trichloronitropropanol and from five to 35 percent of a polymer of which acrylonitrile is at least 70 percent of the total polymerized monomer content.

4. A new composition of matter comprising a homogenous miscible mixture of from 65 to 95 percent by weight of molten trichloronitropropanol and from five to 35 percent of a polymer of at least about 70 percent acrylonitrile and up to about 30 percent of another copolymerizable monomer.

5. A new composition of matter comprising a homogenous miscible mixture of from about 65 to 95 percent by weight of molten trichloronitropropanol and from five to 35 percent of a polymer of at least about 70 percent acrylonitrile and up to about 30 percent vinyl acetate.

6. A new composition of matter comprising a homogenous miscible mixture of from 65 to 95 percent by weight of molten trichloronitropropanol and from five to 35 percent of a polymer of at least about 70 percent acrylonitrile and up to about 30 percent vinylpyridine.

7. A new composition of matter comprising a homogenous miscible mixture of from 65 to 95 percent by weight of molten trichloronitropropanol and from five to 35 percent of polyacrylonitrile.

8. A new compositon of matter comprising a homogenous miscible mixture of from about 65 to 95 percent by weight of molten trichloronitropopanol and from five to 35 percent of a blend of (A) a copolymer of at least 75 percent acrylonitrile and up to 25 percent of another copolymerizable monomer and (B) a copolymer of from 30 to 90 percent of a compound selected from the group consisting of a vinylpyridines and alkyl-substituted vinylpyridines and from ten to 70 percent of another copolymerizable monomer.

9. A new composition of matter comprising a homogenous miscible mixture of from 65 to 95 percent by weight of molten trichloronitropropanol and from five to 35 percent of a blend of (A) a copolymer of at least 75 percent acrylonitrile and up to 25 percent vinyl acetate and (B) a copolymer of from 30 to 90 percent of a compound selected from the group consisting of vinylpyridines and alkyl-substituted vinylpyridines and from ten to 70 percent by weight of acrylonitrile.

10. A new composition of matter comprising a homogenous miscible mixture of molten trichloronitropropanol and a terpolymer containing by weight in the polymer molecule from 85 to 95 percent acrylonitrile, from three to eight percent of a compound selected from the group consisting of vinylpyridines and alkyl-substituted vinylpyridines, and from two to sevent percent of another polymerizable monomer.

11. A process of preparing a fiber-forming solution comprising mixing a polymer of which acrylonitrile is at least 70 percent of the total polymerized monomer content with molten trichloronitropropanol and dissolving the polymer therein.

12. A process of preparing a fiber-forming solution comprising dissolving a polymer of which acrylonitrile is at least 70 percent of the total polymerized monomer content in molten trichloronitropropanol.

No references cited.